United States Patent [19]

Washgurn et al.

[11] Patent Number: 4,972,309

[45] Date of Patent: Nov. 20, 1990

[54] N-PHASE SINEWAVE CONVERTER

[75] Inventors: Robert D. Washgurn, Malibu; Jerry C. Sze, San Francisco; Carlos H. Gonzalez, La Mirada; Robert F. McClanahan, Valencia; David M. Lusher, Torrance, all of Calif.

[73] Assignee: Hughes Aircraft Company, Los Angeles, Calif.

[21] Appl. No.: 323,531

[22] Filed: Mar. 14, 1989

[51] Int. Cl.⁵ .......................................... H02M 7/537
[52] U.S. Cl. ........................................ 363/131; 363/2
[58] Field of Search .................. 363/20, 40, 131, 16, 363/97; 219/10.77

[56] References Cited
U.S. PATENT DOCUMENTS 4,277,667  7/1981  Kiuchi ............................ 219/10.77
4,286,316  8/1981  Friend ............................... 363/131
4,605,999  8/1986  Bowman et al. .................... 363/131
4,679,129  7/1987  Sakakibara et al. .................. 363/40
4,785,387  11/1988  Lee et al. ........................... 363/131
4,845,605  7/1989  Steigerwald ......................... 363/97

Primary Examiner—William H. Beha, Jr.
Attorney, Agent, or Firm—Leonard A. Alkov; Wanda K. Denson-Low

[57] ABSTRACT

A DC to AC sinewave converter having an FET with its gate terminal coupled to a switching signal which turns the FET on and off. A pair of parallel, oppositely conductive diodes couples the drain terminal of the FET to a resonant circuit that is responsive to a source of DC voltage. A clamping diode is connected between the parallel diodes and the source terminal of the FET for preventing the drain and source terminals from being reverse biased.

5 Claims, 3 Drawing Sheets

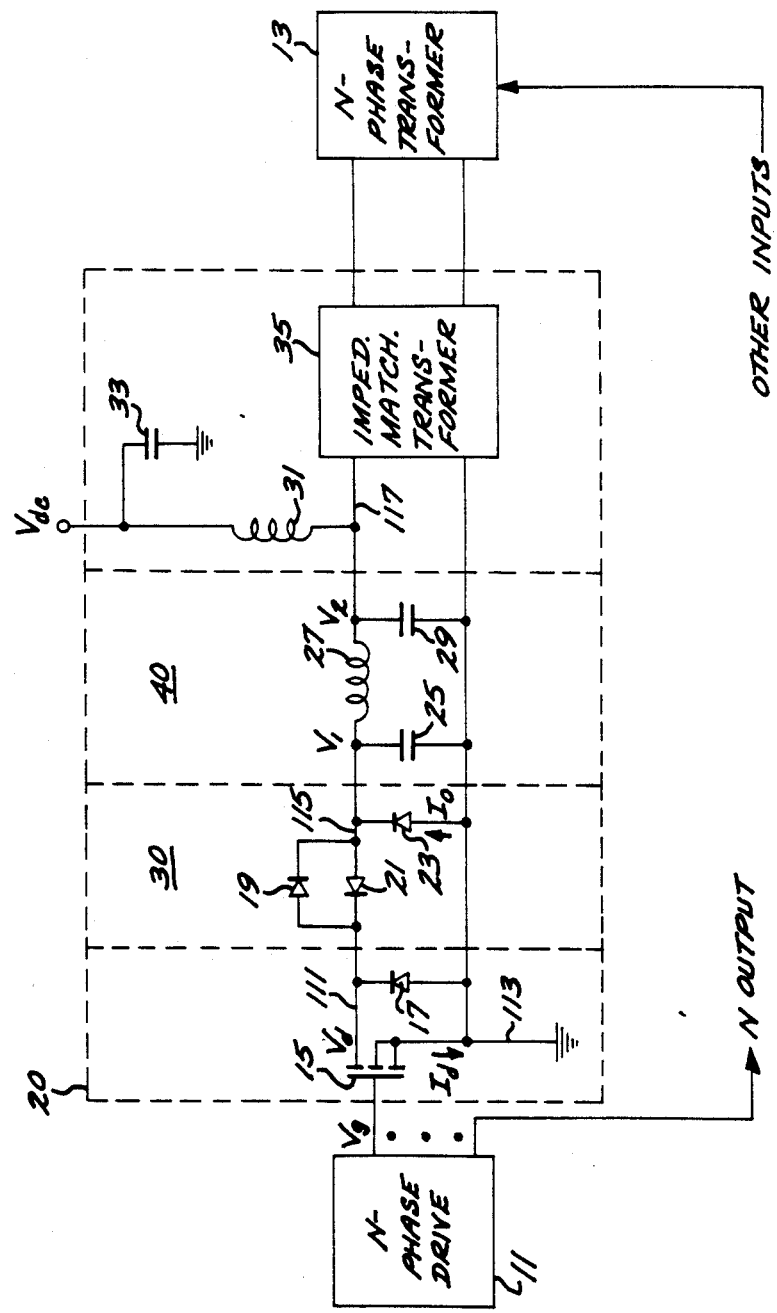

FULL LOAD

LIGHT LOAD

N-PHASE SINEWAVE CONVERTER

BACKGROUND OF THE INVENTION

The disclosed invention is generally directed to DC to AC converters, and more particularly is directed to a sinewave DC to AC converter which operates efficiently over widely varying loads.

DC to AC converters are utilized in power supplies where the originating power source provides a DC voltage, and the supply voltage is stepped up or down relative to the originating power source voltage. DC to AC conversion provides the AC power which can be then stepped up or stepped down as required. Known DC to AC converters include squarewave converters and sinewave converters.

Known sinewave converters include a type sometimes referred to as Class E power converters which operate at high efficiencies and with low noise. However, known Class E power converters operate at high efficiencies only with fixed loads for which they are designed. Different loads, or variable loads, such as pulsed loads, create problems including reduced efficiency, increased noise, possibly circuit device failures.

SUMMARY OF THE INVENTION

It would therefore be an advantage to provide a DC to AC sinewave converter which operates at high efficiency with different or variable loads.

The foregoing and other advantages and features are provided by a DC to AC sinewave converter which includes an FET having its gate terminal coupled to a switching signal which turns the FET on and off. A bilateral, unidirectional current conductive circuit couples the drain terminal of the FET to a resonant circuit that is responsive to a source of DC voltage, and a clamping circuit is connected between the bilaterally conductive circuit and the source terminal of the FET for preventing the drain and source terminals from being reverse biased.

BRIEF DESCRIPTION OF THE DRAWING

The advantages and features of the disclosed invention will readily be appreciated by persons skilled in the art from the following detailed description when read in conjunction with the drawing wherein:

FIG. 1 schematically illustrates a DC to AC sinewave converter according to the invention.

DETAILED DESCRIPTION

Figure 2A:
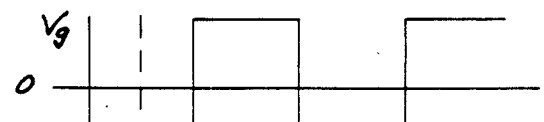
FIGS. 2A-2F illustrate pertinent voltage and current waveforms for full load operation of the sinewave converter of FIG. 1

In the following detailed description and in the several figures of the drawing, like elements are identified with like reference numerals.

Referring now to FIG. 1, shown therein is a schematic diagram of a sinewave converter 10 which includes an N-phase drive circuit 11, which may be a single phase (N=1) drive circuit. The drive circuit 11 can comprise any of a number of known drive circuits, and provides N drive outputs, each having a 50 percent duty cycle over the desired AC operating frequency.

For N greater than 1, each of the outputs of the N-phase drive circuit 11 will have the same operating frequency, but are offset by 360/N degrees. Thus, for example, for a 3-phase system, the drive outputs would be offset by 120 degrees.

Each of the N drive outputs of the N-phase drive circuit 11 is coupled to a respective switching circuit, a representative switching circuit 20 being shown in FIG. 1. The output of the switching circuit 20 is coupled to an N-phase transformer 13. The switching circuits for other phases, if any, would be substantially similar to the switching circuit 20 and would have their outputs coupled to the N-phase transformer 13.

The switching circuit 20 includes an N-channel power FET 15 which has its gate connected to one of the outputs of the N-phase drive circuit 11. The drain of the power FET 15 is coupled to a node 111, while the source of the power FET 15 is coupled to a common reference voltage, which by way of example is shown as a ground node 113.

The cathode of a diode 17 is coupled to the node 111, and the anode of the diode 17 is coupled to the ground node 113. The diode 17 functions to protect the FET against excessive voltage.

A diode network 30 is coupled between the node 111 and the ground node 113. The diode network 30 includes cross coupled diodes 19, 21. The anode of the diode 19 and the cathode of the diode 21 are both connected to the node 111. The cathode of the diode 19 and the anode of the diode 21 are connected to a node 115. The diode network 30 further includes a diode 23, which has its cathode connected to the node 115 and its anode connected to the ground node 113. As discussed more fully herein, the diode 23 conducts reverse current instead of the body diode of the FET 15, and is preferably a fast recovery device.

The switching circuit 20 further includes a C-L-C resonant circuit 40 coupled between the node 115 and the ground node 113. The resonant circuit 40 includes a capacitor 25 coupled between the node 115 and the ground node 113. An inductor 27 is connected between the node 115 and a node 117, and a further capacitor 29 is connected between the node 117 and the ground node 113. The resonant frequency of the resonant circuit 40 is substantially equal to the frequency of the signal applied to the gate of the FET 15.

The tank circuit 40 functions as an impedance matching network, and its elements are selected to provide a Q greater than one (1), as a result of which the voltage across the power FET 15 will ring at the resonant frequency of the tank circuit 40 when the power FET 15 is turned off. That tank circuit particularly matches the output impedance of the power FET 15 to the load applied to the N-phase transformer 13, and further forces the voltage and current transitions (zero crossings) to occur at different times, thereby reducing transistor switching loss. The tank circuit 40 also controls the voltage across the power FET 15 so that at turn-on it does not exceed a maximum of $V_{on}$.

The tank circuit 40 is specifically disclosed as a known design sometimes called a PI circuit, but other impedance matching networks, such as L and T networks, can also be utilized. Also, a power bipolar transistor could be utilized instead of the power FET 15.

The node 117 is coupled to a DC supply voltage source $V_{dc}$ via an inductor 31, which is a feed choke and is large enough to allow a constant flow of current. The inductor 31 further provides RF isolation for the DC supply voltage source $V_{dc}$. An AC ripple filtering capacitor 33 is coupled between the DC voltage source $V_{dc}$ and the ground reference node 113.

The voltage $V_2$ at the node 117 varies sinusoidally, and is out of phase relative to the input to the FET 15 by greater than 135 degrees but less than 180 degrees.

The input of an impedance matching transformer 35 is coupled to the node 117 and the ground reference node 113. The output of the impedance matching transformer is coupled to one input of the N-phase transformer 13.

Figure 2B:
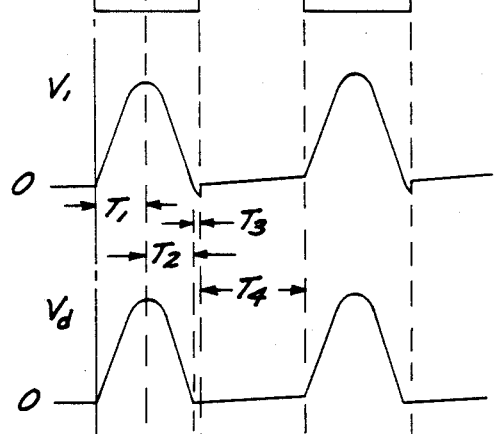
Figure 2C:
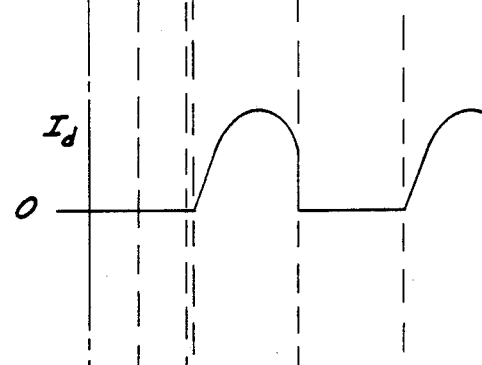
Figure 2D:
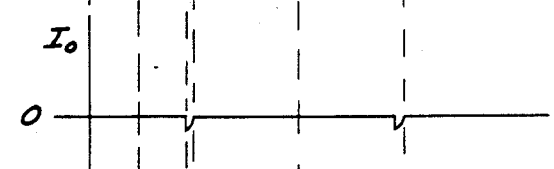
Figure 2E:
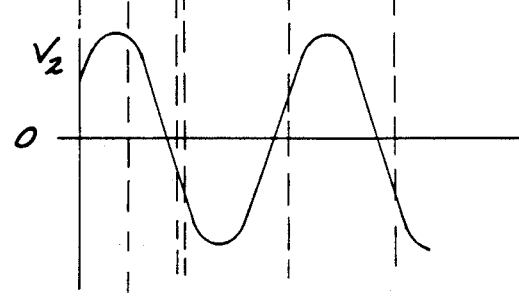
Figure 2F:
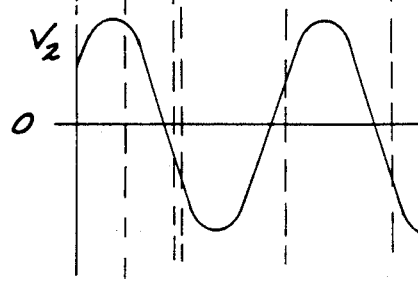
Figure 3A:
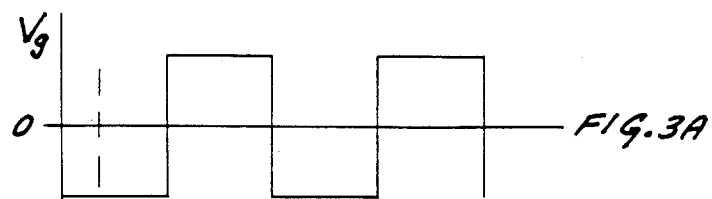
FIGS. 3A-3F illustrate pertinent voltage and current waveforms for light load operation of the sinewave converter of FIG. 1.
Figure 3B:
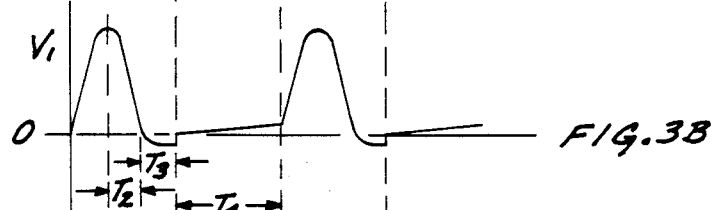
Figure 3C:
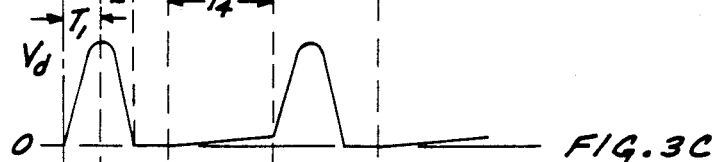
Figure 3D:
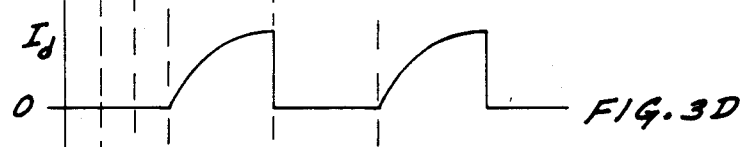
Figure 3E:
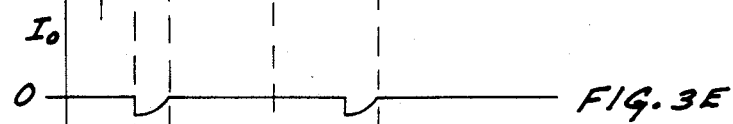
Figure 3F:
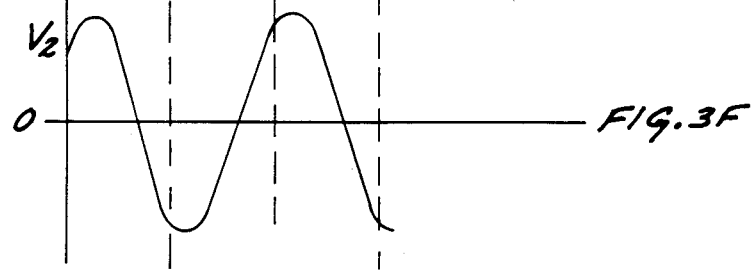

The operation of the sinewave converter 10 for N equal to 1 will now be described with reference to FIGS. 2A-2F and 3A-3F which schematically illustrate pertinent voltage and current waveforms for full load (low impedance) and light load (high impedance) conditions, respectively. The voltage $V_g$ is the voltage applied to the gate of the power FET 15, while $V_d$ in the voltage at the drain of the FET 15. The current $I_d$ is the drain current of the FET 15, and the current $I_o$ is the current through the diode 23. The voltage V1 is the voltage at the node 115, while the voltage V2 is the voltage at the mode 117.

When the voltage $V_g$ at the gate of the FET 15 transitions low, the FET 15 turns off and remains off while the voltage $V_g$ is low. The voltage V1 at the node 115 rings up (increases) over a time period T1 and then down (decreases) over a time period T2. During the same time periods T1 and T2, the voltage $V_d$ at the drain of the FET also rings up and then down as the parasitic capacitance of the FET 15 is charged through the diode 21 and then discharged through the diode 19. As a result of the voltage drop across the diodes 19, 21, the voltage $V_d$ at the drain of the FET 15 is one diode drop less than the voltage V1 when it rings up, and one diode drop greater than the voltage V1 as it rings down.

When the voltage V1 at the node 115 goes negative during the time period T3, the diode 23 conducts the current $I_o$, and prevents the voltage V1 from becoming more negative than one diode drop. As a result, the volta $V_d$ at the drain of the FET 15 is prevented from going below zero. Thus, the body diode of the FET is prevented from being reverse biased. If the body diode of the FET 15 were allowed to be be reverse biased to provide reverse conduction, high dissipation and degraded efficiency would result, as well as possible failure.

When the voltage $V_g$ at the gate of the FET 15 transitions high, the FET 15 turns on and remains on while the voltage $V_g$ is high during the time period T4. The FET drain current $I_d$ conducts through the inductor 27 and the diode 21, causing a voltage drop across the FET 15 equal to the ON-resistance thereof times the drain current. The voltage V1 is one diode drop above the voltage $V_d$ during the time period T4.

At the end of the time period T4, the voltage $V_g$ applied to the gate of the FET 15 again transitions low, and the foregoing repeats.

The voltage V2 at the node 117 takes on a sinusoidal shape as the energy supplied by the DC voltage source $V_{dc}$ rings around the resonant circuit 40 when the FET 15 is periodically turned on and off by the voltage $V_g$ applied to its gate.

With a lighter load, as illustrated in FIGS. 3A-3F, the time periods T1 and T2 are shorter than with full load, while the time period T3 is greater. Also, the peak of the voltage $V_d$ at the drain of the FET 15, while it is off, is greater than with full load. The drop across the FET 15, while it is on, is less.

The clamping action of the diode 23 prevents the body diode of the FET 15 from being reverse biased, thereby preventing highly dissipative reverse conduction, which is particularly significant at lighter loads. Without the clamping action, the FET 15 would be subject to reverse current during the time period T3, which as discussed above increases with lighter loads. Thus, reasonably constant high efficiency, on the order of 92-95 percent, is provided over widely varying loads. As a result of the high efficiency, operating frequencies as high as 10 MHz can be utilized.

The following are examples of operating parameters and component values for the disclosed sinewave converter. The frequency of the signal applied to the gate of the FET 15 is denoted $F_s$, while the peak voltage across the FET is denoted $V_p$.

$V_{dc}$:140 Volts DC
$F_s$:1 MHz
$V_p$:420 V
FET 15:International Rectifier IRF450
Diode 17:Micro Semiconductor IN6173
Diode 19:SEMTECH IN6081
Diode 21:SEMTECH IN6081
Diode 23:Solid State Devices SDR 3K
Inductor 27:1.35 microHenrys
Inductor 31:3.5 microHenrys
Capacitor 25:18.4 nanoFarads
Capacitor 29:12.5 nanoFarads
Capacitor 33:0.05 microFarads While the foregoing has specifically disclosed the use of a power FET, a power bipolar junction transistor could also be utilized, which may require different values for the capacitors 25, 29 and the inductor 27 of the resonant circuit 40.

The foregoing has been a disclosure of a DC to AC sinewave converter which operates at high efficiency with variable loads and over a wide range of loads. The sinewave converter also provides the advantages of low harmonic noise generation, low stresses on the switching components and therefore greater reliability and low cost. Also, the radiated noise is reduced and simpler AC filtering can be utilized. The sinewave converter further allows for higher operating frequencies.

Although the foregoing has been a description and illustration of specific embodiments of the invention, various modifications and changes thereto can be made by persons skilled in the art without departing from the scope and spirit of the invention as defined by the following claims.

What is claimed is:

1. a sinewave converter comprising:
    a switching transistor having (a) a control terminal for receiving a switching signal and (b) first and second controlled terminals which are controllably coupled by a conductive path when said transistor is turned on pursuant to said switching signal;
    a resonant circuit responsive to a source of DC voltage; and
    means for conductively coupling said first and second controlled terminals of said switching transistor to said resonant circuit and for preventing said first and second terminals from being reverse biased wherein said coupling means includes a clamping diode and oppositely conductive, parallel connecting diodes in series with said clamping diode.

2. A sinewave converter comprising
    an FET having its gate terminal coupled to a switching signal which turns said FET on and off;

a resonant circuit responsive to a source of DC voltage;

bilateral unidirectional current conductive means for conductively coupling the drain of said FET to said resonant circuit; and clamping means connected between said bilaterally conductive means and the source terminal of said FET for preventing said drain and source terminals from being reverse biased.

3. The sinewave inverter of claim 2 wherein said bilateral current conductive means provides a voltage drop in the direction of current conduction.

4. The sinewave inverter of claim 3 wherein said bilateral current conductive means comprises oppositely conductive, parallel connected diodes.

5. The sinewave inverter of claim 2 wherein said clamping means includes a clamping diode.

* * * * *